United States Patent [19]
Janssen

[11] 4,157,009
[45] Jun. 5, 1979

[54] TOOL BAR ASSEMBLY FOR TRACK PRESSES

[75] Inventor: Harvey W. Janssen, Lafayette, Calif.

[73] Assignee: Wolff Manufacturing Company, Burlingame, Calif.

[21] Appl. No.: 890,146

[22] Filed: Mar. 27, 1978

[51] Int. Cl.² ............................................. B21L 19/00
[52] U.S. Cl. ...................................................... 59/11
[58] Field of Search ............................ 59/7, 11, 1, 35

[56] References Cited

U.S. PATENT DOCUMENTS

| | | | |
|---|---|---|---|
| 3,075,346 | 1/1963 | Quarve | 59/7 |
| 3,097,477 | 7/1963 | Rodgers | 59/7 |
| 3,939,648 | 2/1976 | Cullen | 59/11 |
| 4,007,584 | 2/1977 | Wolff | 59/11 |

Primary Examiner—C. W. Lanham
Assistant Examiner—Gene P. Crosby

[57] ABSTRACT

A tool bar assembly for use in track presses which includes a tool bar, tool holders, and bushing and pin tools adapted to be removably secured to said tool holders.

3 Claims, 3 Drawing Figures

U.S. Patent    Jun. 5, 1979    4,157,009
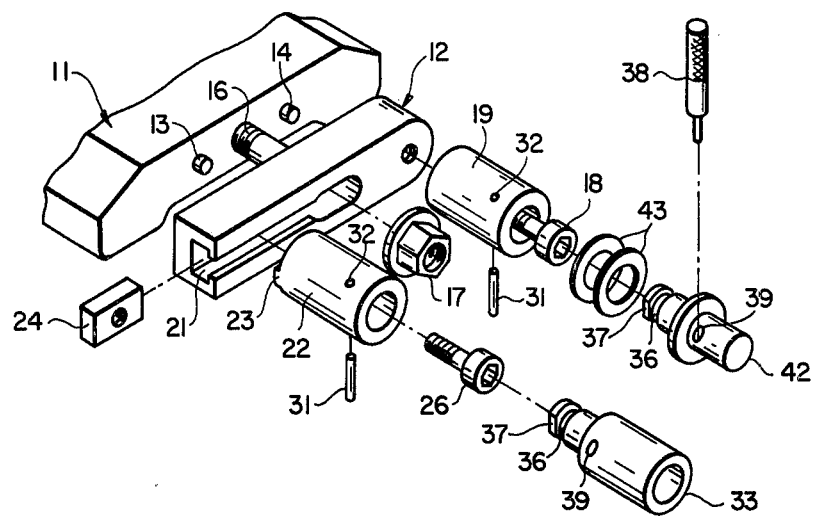
FIG__1
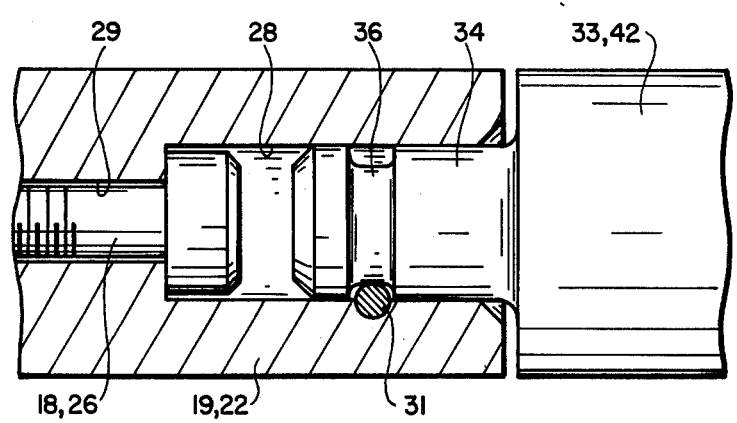
FIG__2
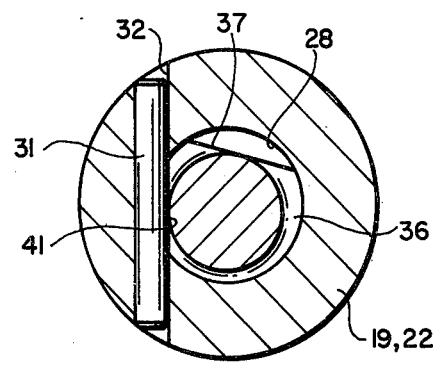
FIG__3

TOOL BAR ASSEMBLY FOR TRACK PRESSES

BACKGROUND OF THE INVENTION

This invention relates generally to tool bars for use in track presses and more particularly to an adjustable pitch tool bar assembly having easily and rapidly changeable bushing and pin tools.

Crawler or track laying tractors are widely used particularly in heavy duty work. The track employed in such tractors includes ground engaging shoes or growsers removably secured to a drive chain. The drive chain includes a plurality of sections, each section including a pair of spaced apart side links. The sections are pivotally jointed to one another by means of cross pins and bushings. The bushings and pins are press fit into the cooperating ends of links to pivotally join the sections to one another to form the chain.

Because of the nature and operation of tractors, the tracks are subjected to rapid wear and require frequent repair. Generally, for repair, the track is removed from the tractor by removal of a master pin, mounted on a track press and moved to present the links in succession to a track press work station. The work station includes a jaw for holding the chain in position as hydraulic rams move spaced pin and bushing tools mounted on a tool bar into cooperative relationship with the pins and bushings to remove the pins and bushings from the links to disassemble the track. During assembly of the track, the track is moved in the opposite direction and the pins and bushings are reinserted by spaced pin and bushing tools. It is common during assembly to have to disassemble and reassemble a number of sections because of faulty reinsertions of pins and bushings or lubricant leakage. In such instances, the assembly pin and bushing tools must be removed and the disassembly pin and bushing tools inserted and then the assembly pin and bushing tools reinserted for reassembly.

There are many models and sizes of track laying tractors manufactured by each of a number of manufacturers. The track size differs for different models, sizes and manufacturers. As a result, different sizes and pitch of pin and bushing tools are required to provide the proper pitch and size to engage the pins and bushings for the variety of tracks encountered.

In U.S. Pat. No. 3,075,346, there is shown and described a tool bar including a T-groove and T-bolts which hold the bushing and pin tools and which provides for adjusting the pitch. Tool bars are also available having spaced pairs of tool mounting holes disposed on a centerline. A multiple pitch tool including a plurality of pairs of tool mounting holes and which also include means for mounting the bar on the track press tool head at different heights is described in U.S. Pat. No. 3,939,648. Another adjustable pitch tool bar is described in U.S. Pat. No. 4,007,584.

The foregoing track press tools provide improvements over the prior art. They are adjustable and adaptable for a large number of tracks. However, in the assembly and disassembly of modern tracks, as pointed out above, it is often required during assembly that certain links be disassembled and reassembled. In such instances, the pin and bushing tools must be changed. In the prior art the tools must be disassembled from the tool bar and reassembled. This operation is time consuming. There is, therefore, a need for a tool bar having pin and bushing tools which are easily interchangeable for assembly and disassembly operations.

OBJECTS AND SUMMARY OF THE INVENTION

It is a general object of the present invention to provide a tool bar assembly in which the pin and bushing tools are readily interchanged.

It is a further object of the present invention to provide a tool bar assembly in which the pin and bushing tools are received in a tool holder.

The foregoing and other objects of the invention are achieved by a tool bar assembly which includes a tool bar, spaced pin and bushing tool holders secured to said tool bar and pin and bushing tools adapted to be removably secured to said tool holders.

BRIEF DESCRIPTION OF THE DRAWINGS

FIG. 1 is an exploded view of an adjustable pitch tool bar assembly mounted on a track press tool head.

FIG. 2 is an enlarged view of a pin and bushing tool holder with an associated bushing tool.

FIG. 3 is a sectional view showing the pin and bushing tool retaining means.

DESCRIPTION OF PREFERRED EMBODIMENTS

Referring to FIG. 1, there is shown a hydraulically driven track press tool head 11 which is adapted to receive an adjustable pitch tool bar 12. The tool head includes a pair of spaced pins 13 and 14 and a tool bar mounting stud 16. The adjustable pitch tool bar is placed over the stud and recesses (not shown) accommodate the pins 13 and 14 to prevent rotational movement. The tool bar is secured to the mounting stud by a flanged nut 17. The adjustable pitch tool bar 12 is tapped at one end to receive a stationary tool holder bolt 18 which is adapted to secure the stationary tool holder 19 to the end of the adjustable pitch tool bar 12.

The other end of the tool bar includes a reentrant T-slot 21 which is adapted to receive a T-slot nut 24. The tool holder 22 is adjustable and includes a pair of spaced ears 23 which ride in the slot 21. A tool holder mounting bolt 26 serves to mount the adjustable tool holder 22 by engaging the T-slot nut 24 to the other end of the adjustable pitch tool bar. By loosening the nut, the position along the T-slot can be changed to adjust the pitch or distance between the holders 19 and 22.

Referring now more particularly to FIG. 2, an enlarged view of a tool holder is presented. The tool holder includes a well 28 and hole 29 adapted to receive bolts 18 or 26 whereby to provide a shoulder and secure the holder to the tool bar. A pin 31 is inserted in the holder after the bolt 18 has been secured. As seen in the drawings, approximately one-half the diameter of the pin extends into the well 28. The pin is press fit into its hole 32.

Referring now to FIGS. 2 and 3, a bushing tool 33 is illustrated removably secured to holder 22. The bushing tool 33 includes a stud 34 provided with an eccentric groove 36. The end of the stud has a flattened portion 37 whereby the stud can be inserted into the well 28 with the flat 37 cooperating with the pin 31 to permit insertion or seating. After the tool is seated, it is rotated by inserting a tool tightening handle 38 into an accommodating hole 39 and rotating the bushing tool until the surface 41 of the eccentric groove engages and cams against the pin 31 to thereby lock the bushing tool in place. The bushing tool is easily removed by rotating and withdrawing. Thus, it is seen that the bushing tool can be readily replaced without the time consuming loosening of bolt 26 as would have been necessary with prior art tooling. The pin tool 42 includes like parts which have been provided with like reference numbers. If the bushing and pin tools wear, shims 43 may be employed.

I claim:

1. An adjustable pitch tool bar assembly for track presses including a tool bar adapted to be mounted to a track press tool head, spaced pin and bushing tool holders secured at spaced positions on said tool bar, pin and bushing tools adapted to be mounted on said holders, and means for removably securing said pin and bushing tools to said pin and bushing tool holders respectively, said means including a stud on said pin and bushing tools, an eccentric groove formed in said stud adjacent the end thereof, a well in each of said holders for receiving the stud of the associated tool, and a cross pin in said holder extending into said well to be engaged by the surface of said groove when the associated tool is rotated after the stud has been seated.

2. An adjustable pitch tool bar assembly as in claim 1 in which said eccentric groove is spaced from said one end and said one end includes a flat to permit the insertion of the stud prior to rotation.

3. An adjustable pitch tool bar assembly as in claims 1 or 2 in which at least one of said tool holders is adjustable along the tool bar to adjust the spacing between holders.

* * * * *